United States Patent [19]

Tortorello

[11] Patent Number: 4,489,179

[45] Date of Patent: Dec. 18, 1984

[54] AQUEOUS POLYEPOXIDE EMULSIONS

[75] Inventor: Anthony J. Tortorello, Elmhurst, Ill.

[73] Assignee: DeSoto, Inc., Des Plaines, Ill.

[21] Appl. No.: 573,207

[22] Filed: Jan. 23, 1984

[51] Int. Cl.³ .................... C08L 63/10; C08L 63/02
[52] U.S. Cl. ...................................... 523/420; 523/404
[58] Field of Search ............................. 523/404, 420

[56] References Cited

U.S. PATENT DOCUMENTS 4,289,595  9/1981  Tortorello .................. 204/159.11
4,371,669  2/1983  Mylonakis et al. ............. 526/311
4,427,804  1/1984  Tortorello et al. ............. 523/404

FOREIGN PATENT DOCUMENTS 3002865  7/1981  Fed. Rep. of Germany ...... 523/404

OTHER PUBLICATIONS

Chemical Abstracts, vol. 95, No. 16, Oct. 19, 1981, p. 84, Abstract 95:134473b.

*Primary Examiner*—Ronald W. Griffin

*Attorney, Agent, or Firm*—Dressler, Goldsmith, Shore, Sutker & Milnamow, Ltd.

[57]        ABSTRACT

A room temperature-curing emulsion coating composition is disclosed in which a solution of normally solid polyepoxide polymer having a 1,2-epoxy equivalency of at least 1.4 and a molecular weight up to about 2000 in inert volatile organic solvent is emulsified into water having dissolved therein a monosecondary amine containing at least one primary amine group which is ketimine blocked by reaction with a ketone which is hindered to prevent reaction with a secondary amino hydrogen atom, this hindered ketone being selected from the group consisting of noncyclic ketones containing one group selected from methyl or ethyl and a second group containing at least four carbon atoms, and cyclic ketones which are substituted in the alpha position. The monosecondary amine is dispersed in the water of the emulsion by at least 50% neutralization of amine functionality with a volatile solubilizing acid either as such or after reaction into a polymer by means of its secondary amino hydrogen atom.

8 Claims, No Drawings

AQUEOUS POLYEPOXIDE EMULSIONS

DESCRIPTION

This application is an improvement over the prior application of M. A. Kinsella and myself, Ser. No. 353,099 filed Mar. 1, 1982, now U.S. Pat. No. 4,427,804, issued Jan. 24, 1984.

TECHNICAL FIELD

This invention relates to aqueous emulsion coating compositions which cure at room temperature.

BACKGROUND ART

The prior application disclosed aqueous polyepoxide emulsions in which amine-functional acid salts were used to stably suspend the polyepoxides in the aqueous medium and to function as a room temperature curing agent when the emulsion was coated upon a substrate. Room temperature denotes normal ambient temperatures in the approximate range of 20° C.-25° C. These emulsions are stable for at least about one hour, but cure readily when the emulsion is coated upon a substrate and the water and acid evaporate so that the polyepoxide component and the amine-functional component become reactively associated in the film which is formed.

While a slow room temperature cure was particularly contemplated, somewhat elevated temperatures were indicated to speed the cure.

The previous application used liquid polyepoxides, and these are of relatively low molecular weight and tend to produce films which are less flexible than is sometimes desired. This invention attempts to increase the molecular weight of the polyepoxide component of my prior application to employ polyepoxides which are solid at room temperature. Cure at room temperature to provide films having superior flexibility is particularly contemplated.

DISCLOSURE OF INVENTION

In accordance with this invention, an aqueous emulsion coating composition is provided in which a solution of normally solid polyepoxide polymer having a 1,2-epoxy equivalency of at least 1.4 and a molecular weight of up to about 2000 in inert volatile organic solvent is emulsified into water having dissolved therein a monosecondary amine containing at least one primary amine group which is ketimine blocked by reaction with a ketone which is hindered to prevent reaction with a secondary amino hydrogen atom, this hindered ketone being selected from the group consisting of noncyclic ketones containing one group selected from methyl or ethyl and a second group containing at least four carbon atoms, and cyclic ketones which are substituted in the alpha position. This monosecondary amine, either as such or after reaction to incorporate it into a low molecular weight polymer, is dispersed in the water of the emulsion with the aid of a volatile solubilizing acid, like acetic acid.

Turning first to the monosecondary amine which has at least one primary amine group which is ketimine blocked, the amines which may be utilized are preferably illustrated by diethylene triamine. This amine contains two primary amine groups and a single secondary amine group. Corresponding compounds containing propylene or butylene groups in place of the ethylene group are also useful. Corresponding compounds containing only a single primary amine group are also useful, though less preferred, such as N-methyl-1,3-propanediamine.

The primary amine functionality noted above must be tied up before the amine is reacted to form a polymer or placed in water. This is accomplished by ketimine formation. The reaction of the hindered ketone with the primary amine functionality to form ketimine groups is conveniently carried out at moderate temperature with the aid of an acid catalyst, the reaction being encouraged by the removal of water.

The ketones which are selected should be hindered to avoid reaction with the secondary amino hydrogen atom. Where such reaction occurs, a five membered ring is formed (an imidazolidine) and this destroys the primary amine functionality which it is desired to liberate in the form of an at least partially neutralized salt with a volatile acid in the aqueous medium of the emulsion.

Typical hindered ketones contain one methyl or ethyl group and a second group containing at least four carbon atoms so as to be large enough to prevent reaction with the secondary amino hydrogen atom. This description of hindered ketones will describe the preferred noncyclic ketones, illustrated herein by methylisobutyl ketone, but cyclic ketones, such as alpha-methyl cyclohexanone, may also be used if they are hindered by being alpha branched. Even a single methyl group alpha to the carbonyl group is sufficient to prevent reaction with a secondary amino hydrogen atom. Other useful hindered ketones are ethylisobutyl ketone and methylamyl ketone.

The temperature of reaction between the amine and the hindered ketone is not a prime feature of this invention, appropriate temperatures ranging from 70° C. to 100° C.

This reaction is catalyzed by using any strong Bronsted acid, such as, for example, sulfuric acid or paratoluenesulfonic acid. It is particularly convenient to employ a sulfonic acid-functional anion exchange resin, such as Dowex 50W-X8 which is a product of Dow Chemical Company.

The reaction is conveniently carried out in the presence of an organic solvent which simplifies the removal of water. These solvents are illustrated by cyclohexane and benzene. The reaction is normally carried out by heating the solution to reflux temperature and then separating the water produced by the reaction from the condensed vapors in a Dean-Starck trap.

After the reaction is over, heating is continued to boil off the solvent in which the reaction is conducted. A vacuum is normally used to ease the burden of removing the solvent.

The result of the foregoing is a ketimine-blocked monosecondary amine monomer. These monomers are typically liquids which are dispersible in water with the aid of a solubilizing acid, illustrated by acetic acid. Volatile solubilizing acids are well known in the art of dispersing amine-functional polymers, and any of these known acids may be used herein. When these acid-neutralized products (salts) are placed in water, the ketimine blocking agent is released, and this regenerates primary amine functionality, albeit in salt form. This amine functionality is not strongly reactive in the aqueous medium because of the acid which is present. Neutralization of the amine content by the acid should be at least 50% of stoichiometry, but greater pot life is obtained by greater neutralization, 100% being preferred herein.

When these emulsions are used as a coating, the water and the solubilizing acid vaporize away, collapsing the emulsion and liberating the primary amine groups for cure. The volatile solvent helps to form a continuous film, and it also vaporizes away.

While the primary amine groups are blocked as taught herein, the monosecondary amine-functional product can be reacted with a low molecular weight (up to about 5000) polymer, especially those containing the 1,2-oxirane group or, more preferably, the isocyanate group. These react by an addition reaction with the secondary amino hydrogen atom to couple the ketimine blocked products to the polymer while retaining these ketimine groups to prevent further reaction of these groups until water hydrolysis releases the ketone to free the primary amine functionality.

The ketimine blocked monosecondary amine is dispersed in the water of the emulsion by at least 50% neutralization of amine functionality with a volatile solubilizing acid either as such or after reaction into a polymer by means of its secondary amino hydrogen atom.

A preferred water dispersible product in this invention is made by reacting stoichiometric proportions of the monosecondary amine ketimine described hereinbefore with an organic polyisocyanate, preferably a diisocyanate such as diphenylmethane diisocyanate, to provide a polyurethane containing blocked primary amine groups. This polymeric product is dispersible in water by at least partial neutralization with a volatile solubilizing acid, such as acetic acid, to provide an aqueous dispersion which can be formulated into a coating composition by the addition of a polyepoxide solution to form an emulsion in accordance with this invention. Other acids are illustrated by propionic acid and formic acid, but acetic acid is inexpensive and convenient to use.

The polyepoxides which are used herein should have a 1,2-epoxy equivalency of at least about 1.4 and sufficient molecular weight to be solid at room temperature. Diglycidyl ethers of a bisphenol having a molecular weight up to about 2000 are useful herein. Bisphenol A is preferred, and diglycidyl ethers thereof having a molecular weight of about 1000 will be used herein as illustrative.

The polyepoxide must be sufficiently fluid to be disrupted into finely divided entities when it is dispersed in the aqueous amine salt-containing continuum, and this requires the presence of an organic solvent. The solvent is preferably water immiscible to minimize contact between the polyepoxide and the water, but the preferred solvents need not be totally immiscible with water. Methyl ethyl ketone which forms a 27% solution in water will be used herein as illustrative, but methyl isobutyl ketone, toluene, and the like, are also useful. Enough solvent should be used to substantially completely dissolve the polyepoxide, but the less solvent the better. I have found that from 60% to 80% solids content solutions are particularly effective.

Since the 1,2-oxirane functionality in the polyepoxide is reactive with the amino hydrogen atoms of the primary amine groups which become available when the volatile acid vaporizes, the continuous films formed by emulsion collapse on a coated substrate provide room temperature curing coatings. The cure speed can be increased with heat, but the cure does not require elevated temperature and would normally be carried out without it.

Throughout this application and in the examples and claims which follow, all proportions are by weight unless otherwise specified.

EXAMPLE 1

Into a 2-liter single neck flask is weighed 47.7 grams of diethylene triamine, 99.5 grams of methylisobutyl ketone, 0.25 gram of Dowex 50W-X8 ion exchange resin, and enough benzene to make a final volume of 750 ml. The flask is equipped with a magnetic stirrer, Dean-Starck trap and reflux condenser (with drying tube).

The mixture is then heated to reflux with stirring and water is azeotropically removed. Reflux is continued until water is no longer collected. The solution is then cooled to ambient temperature and the resin is filtered. The filtrate is then concentrated in a rotary evaporator using vacuum.

The product is transferred to an amber bottle without further purification and stored under nitrogen in a refrigerator.

EXAMPLE 2

An isocyante-terminated prepolymer was provided by reacting 95.2 grams of diphenylmethane diisocyanate with 224.8 grams of polytetraoxymethylene glycol (Quaker Oats product Polymeg 650 may be used) in 240 grams of 1,2-dimethoxyethane and 168 grams of 2-methylpyrrolidinone. The product is an isocyanate-functional prepolymer in solvent solution.

EXAMPLE 3

The prepolymer solution of Example 2 is mixed with the ketimine-blocked diethylene triamine of Example 1 in a stoichiometic amount based on secondary amino hydrogen and isocyanate functionality. These two reactive groups react together at 60° C. in 30 minutes.

EXAMPLE 4

The product of Example 3 was dispersed in water by first mixing it with an equivalent amount of acetic acid based on total amine present in a stainless steel beaker (to avoid breakage when high shear mixing is employed). Low shear agitation is first applied for a few minutes to ensure complete mixing. Agitation is then increased to high shear and deionized water is added slowly. Viscosity continues to rise until inversion is reached as evidenced by dramatic viscosity reduction. Addition of water to the desired concentration is continued. Since spray application is intended in this example, water is added to provide a 35% solids solution.

EXAMPLE 5

100 grams of Epon 1001, which is a diglycidyl ether of bisphenol A having an average molecular weight of about 1000, is slowly added to 42 grams of methyl ethyl ketone with stirring until a homogeneous solution containing about 70% solids is obtained. Enough solvent is used to provide an emulsifiable liquid, but the proportion of solvent is desirably minimized since it is preferred to use as little solvent as possible in the final coating emulsion.

EXAMPLE 6

A stoichiometric proportion of the polyepoxide solution of Example 5 is added to the amine polymer salt aqueous solution of Example 4 with agitation. This stoichiometry is based upon 1,2-oxirane groups in the polyepoxide solution and the primary amino hydrogen atoms which are uncovered by hydrolysis in the aqueous solution. The result is an emulsion which is stable in the sense that no significant change is observed for at least one hour. The emulsion is now thinned to spray viscosity by the addition of deionized water. This emulsion is then sprayed upon a substrate to form a coating about 1 mil thick, like an aluminum or steel panel, and the deposited coating forms a continuous film which cures slowly at room temperature. The room temperature cure is largely complete in one day, and a corresponding cure can be had in one hour at 200° F.

What is claimed is:

1. A room temperature-curing emulsion coating composition comprising a solution of normally solid polyepoxide polymer having a 1,2-epoxy equivalency of at least 1.4 and a molecular weight up to about 1000 in inert volatile organic solvent emulsified into water having dissolved therein a monosecondary amine containing at least one primary amine group which is ketimine blocked by reaction with a ketone which is hindered to prevent reaction with a secondary amino hydrogen atom, said hindered ketone being selected from the group consisting of noncyclic ketones containing one group selected from methyl or ethyl and a second group containing at least four carbon atoms, and cyclic ketones which are substituted in the alpha position, said monosecondary amine being dispersed in the water of the emulsion by at least 50% neutralization of amine functionality with a volatile solubilizing acid either as such or after reaction into a polymer by means of its secondary amino hydrogen atom.

2. An emulsion as recited in claim 1 in which said amine functionality is 100% neutralized.

3. An emulsion as recited in claim 2 in which said monosecondary amine is diethylene triamine which is ketimine blocked with methylisobutyl ketone.

4. An emulsion as recited in claim 3 in which said polyepoxide is a diglycidyl ether of a bisphenol.

5. An emulsion as recited in claim 1 in which said polyepoxide solution has a solids content of 60% to 80%.

6. An emulsion as recited in claim 5 in which said polyepoxide solution contains methyl ethyl ketone as solvent.

7. An emulsion as recited in claim 1 in which said monosecondary amine is prereacted with a polymer having a molecular weight up to about 5000 and reactive groups selected from 1,2-oxirane and isocyanate groups.

8. An emulsion as recited in claim 7 in which said polymer is a diisocyanate-functional polyurethane obtained by reacting polytetraoxymethylene glycol with excess organic diisocyanate.

* * * * *